Sept. 13, 1960     H. KREIDEL ET AL     2,952,289

LOCKNUT HAVING INTEGRAL LOCKING MEMBRANE THEREWITH

Filed Dec. 4, 1957

INVENTORS
HANS KREIDEL, SR.
HANS KREIDEL, JR.

BY

ATTORNEY

United States Patent Office 2,952,289
Patented Sept. 13, 1960

2,952,289

LOCKNUT HAVING INTEGRAL LOCKING MEMBRANE THEREWITH

Hans Kreidel and Hans Kreidel, Jr., Wiesbaden, Germany, assignors to Inventex Aktiengesellschaft, Küsnacht-Zürich, a corporation of Switzerland Filed Dec. 4, 1957, Ser. No. 700,711

Claims priority, application Switzerland Jan. 18, 1957

4 Claims. (Cl. 151—21)

This invention is concerned with a locknut comprising a locking membrane which is integral with the body thereof.

Known devices for locking nuts in assembled position upon threaded bolts and the like include the use of counter-nuts or conical nuts or slotted nuts having recesses formed therein for accommodating splints, wires and the like which extend through bores in the corresponding threaded bolts. There are also locknuts known which are made of one piece and wherein the locking against inadvertent loosening is due to a braking action of the thread. The braking action is effected by a deformation of the body of the nut which may be provided with slots formed therein.

In a known locknut of this kind, the thread is undercut by a narrow groove resulting in the formation of a relatively thick annular bead carried by the body of the nut. This bead is connected with the body of the nut by the ridge portion extending between the base of the groove and the outer surface of the nut, thus anchoring the bead relatively rigidly in its position. The braking action between the thread of the nut and the thread of the bolt or the like, on which the nut is placed, is to be effected by plastic deformation and particularly by inward jamming of the rigid and relatively non-elastic annular bead, requiring a special tool so as to avoid crushing of the connecting ridge extending between the bead and the nut body. The relatively rigid positioning of the bead prevents satisfactory elastic action thereof with respect to the thread, during the threading operation. The plastic deformation of the bead may easily result in damaging the thread turns and particularly, displacing such turns so that they extend at the deformed bead detrimentally displaced relative to the axis of the threaded connection. The resilient action that may be achieved in such structure is at best very slight and subject to quick fatigue, especially in cases in which the corresponding connection is under strong tensile stress or variable stress or subjected to vibration. A particular disadvantage resides in the fact that such nut locking device does not give any possibility to avoid as an affecting factor the necessary and permissible play between the inner thread of the nut and the outer thread of the bolt on which the nut is placed. For example, if a nut whose thread diameter lies at the minus tolerance limit is threaded upon a bolt whose thread diameter lies at the plus tolerance limit, the deformation of the annular bead will obviously be nullified during the joining threading operation, restoring the bead into its original position and thereby cancelling the brake action between the nut thread and the bolt thread. Locknuts of this kind are accordingly unsuitable for practical use.

Another known locknut structure provides for a certain degree of elasticity but exhibits other drawbacks that exclude practical use. The corresponding locknut carries a ring-shaped extension at the free end thereof, such extension being bent over inwardly and provided with an inner thread in common with the nut body. This ring-like extension is extremely thin so that it can function in the manner of a membrane and is disposed approximately midway of the circular plane extending at the corresponding end of the nut body between the circular terminal plane of the inner thread and the circle defined by the surfaces of the polygon provided for cooperation with a wrench. The inwardly bent ringlike membrane extends at an acute angle with respect to the inwardly conically extending end surface of the nut body. The membrane may be of convex or concave or plane configuration. In order to become effective, the nut body with the inwardly bent membrane is provided in one operation with throughout identical thread. The braking action between the membrane and the corresponding threaded bolt is to be effected upon threading the nut upon the bolt. The thin membrane thereby enters into the outer thread turns of the bolt and is deformed in undulating wavy manner, thus producing a certain locking action with respect to the thread on the bolt. Since the membrane extends at an acute angle with respect to the inwardly conically shaped nut body, considerable stresses will result at the transition between the thin membrane and the nut body. These stresses are increased due to a groove formed at the transition which is provided for facilitating the bending-over operation, the groove necessarily further weakening the cross-sectional transition area. The membrane, which is due to the bending-over thereof under great stress, may easily break responsive to the deformation stresses applied thereto in threading cooperation with the bolt on which the nut is placed. The resilient action of the thin membrane is, moreover, slight and, assuming that it does not break in threading the nut on the bolt, does not provide for reliable security against loosening of the nut. The nut provided with such a membrane is so highly sensitive that it becomes unsuitable for rough handling. Slight mechanical influences occurring, for example, in manipulations required for packing, or accidental dropping of a nut, etc., may damage the membrane and detrimentally affect its operation or render its operation uncertain.

The invention avoids the disadvantages and drawbacks of prior locknuts of the above indicated kind by fully utilizing in a locknut the elastic braking forces that can be achieved with a locking membrane, in a manner that will meet all requirements for securing the nut in assigned position. This is achieved by particular configuration of the locking membrane in conjunction with particular configuration of the nut body carrying the inner thread and the free end of such nut body.

The locking membrane is in accordance with the invention of potlike configuration. Its base is disposed upon the nut approximately along an annular plane defining the outer end of the wrench polygon. The outer diameter of the locking membrane corresponds approximately to the diameter of a circular line extending in alignment with the surfaces of the wrench polygon, the inner surface of the membrane being spaced by an annular trenchlike groove from the part of the nut body carrying the inner thread, such part extending into the bell-shaped space formed by the pot-shaped membrane. The nut body and the annular opening of the pot- or bell-shaped membrane are provided with the identical inner thread, but the thread along the inner edge of the membrane is axially displaced with respect to the inner thread of the nut.

The cooperation of the above indicated features results in the provision of a locking membrane with gradual transition from its base, which extends in parallel with the axis of the nut, into its end portion extending approximately perpendicularly thereto; the plastic deformation required for forming the membrane proceeding from the base thereof along rounded transition areas to the nut body, in a manner taking into consideration the properties of the material and embracing a surface as large as possible, thereby imparting resiliency to the membrane.

The pot- or bell-shaped locking membrane according to the invention easily absorbs the forces occurring at its base and exhibits at its inner edge or rim elastic restoring power acting upon the thread turns of the corresponding threaded bolt with a strength that is sufficient for producing satisfactory braking or locking action. The trenchlike annular space formed between the nut body and the membrane and extending axially inwardly of the nut body to a depth beyond the operationally free end thereof facilitates the bending-over required for forming the membrane and places the membrane in a position in which its elastic action can become fully effective.

The locknut according to the invention is threadedly joined with a screw-threaded bolt or the like, with the locking membrane disposed at and overlying the free end of the corresponding nut. The pot- or bell-shaped locking membrane extends in its initial position approximately perpendicular to the axis of the corresponding threaded bolt or threaded shaft and is free to move substantially only in a direction axially away from the body of the nut. There is in opposite direction practically no possibility for displacement because the membrane is nearly in engagement with the nut body. The thickness of the membrane should exceed one-half of the width of a thread turn and may correspond to the width of a thread turn.

The restoring forces of the membrane will in such structure become effective in far reaching manner uniformly as braking or locking forces with respect to the flanks of the thread, such that these braking forces are easily overcome during the tightening of the corresponding nut while requiring greater force incident to loosening the nut. The braking force may be increased by varying the pertinent factors, especially by increasing the thickness of the membrane, to such an extent that inadvertent loosening of the nut becomes impossible.

This is of particular importance in case of threaded joints subjected to vibration or shocks, preventing fatigue phenomena with respect to the braking action, under prolonged operating stress even in the presence of relatively high temperatures. It is of particular importance that damage of the thread in the locknut as well as on the corresponding threaded bolt or the like does not occur in the cooperation of the parts because the braking action is effective only along the flanks of the threads. The braking action is for the same reasons unaffected by the permissible tolerances between the inner thread of the nut and the outer thread of the corresponding bolt, because the slight tolerance variations will affect only the mutually cooperating surfaces of the thread flanks.

The various objects and features of the invention will appear from the description of an embodiment thereof which will be rendered below with reference to the accompanying drawing. In the drawing.

Figure 1:
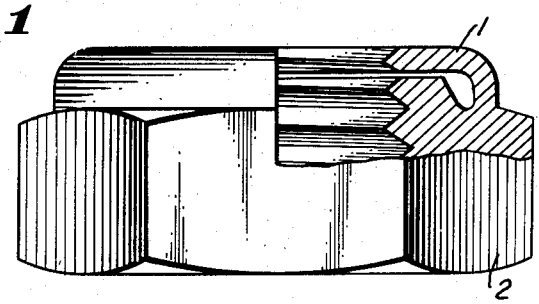
Fig. 1 shows a locknut according to the invention in part elevational and part sectional view.
Figure 2:
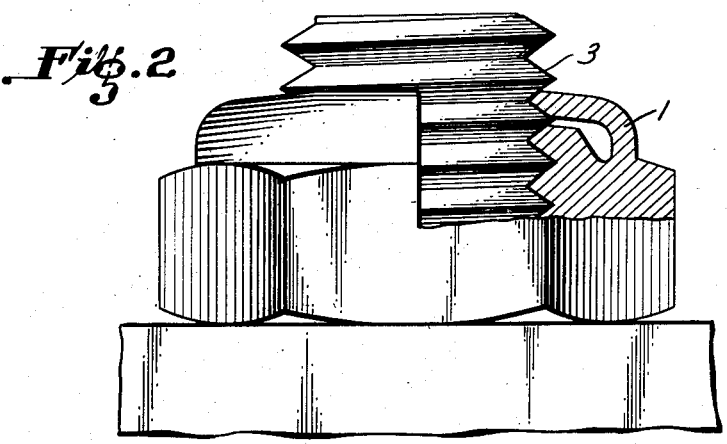
Fig. 2 shows the locknut in part sectional part elevational view in assembled, threaded connection with a bolt.
Figure 3:
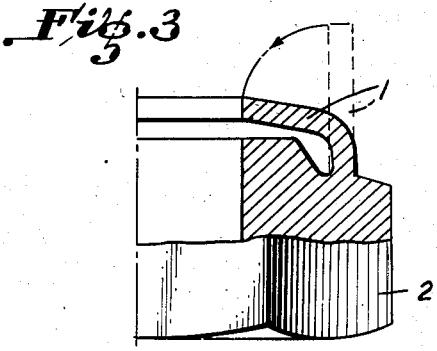
Fig. 3 is a fractional part sectional view of the locknut prior to forming the inner thread thereon.
Figure 4:
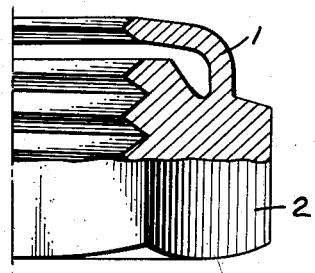
Fig. 4 is a view showing the locknut according to the representation of Fig. 3 but with the inner thread formed therein.

The blank for the locknut is formed with a tubular axially extending skirt 1 shown in Fig. 3 in dotted lines, the skirt having an outer diameter corresponding substantially to the diameter of a circular line which approximately coincides with a line defining the diameter on which are disposed the wrench polygon surfaces. This skirt is peened over or bent radially inwardly about 80° to 85° to form the locking membrane shown in Fig. 3 in full lines. The inner thread is thereafter cut in one operation in the nut body 2 and in the membrane 1, resulting in the structure indicated in Fig. 4, whereupon the membrane 1 is pressed axially inwardly to position it as close as possible to the free end of the nut body into the position in which it is shown in Fig. 1, in which position it can exert the braking or locking action according to the invention. In this position, the membrane can practically move during the threading of the nut on a screw bolt 3 only in a direction axially away from the nut body 2, as shown in Fig. 2. The membrane 1 thereby expands, that is, it spreads resiliently somewhat within the range of its displacement against the nut body, resulting in a braking or locking action between the flanks of its screw thread and the flanks of the thread on the bolt 3, which is essentially effective in the direction of the nut body, thus securing the nut against inadvertent or accidental loosening.

As indicated before, the various factors affecting the operation of the locking membrane, for example, positioning of the base thereof radially outwardly of the nut body and axially thereof, provision of a relatively wide well rounded trenchlike intermediate space extending axially into the nut body, thickness of the membrane so as to accommodate one or more turns of the thread, may be controlled as desired so as to provide braking forces of a magnitude that will make accidental or undesired loosening of the nut practically impossible.

The inner thread of the locknut is in tightened position thereof covered toward the outside, thus preventing ingress of dirt and moisture that might affect its secure position.

It may be mentioned in conclusion that the length of thread required for securing the structure is fully preserved. The nut may be made of any desirable and suitable material.

Changes may be made within the scope and spirit of the appended claims.

We claim:

1. A locknut comprising a nut body proper carrying an inner thread cut therein, a generally pot-shaped locking member disposed at the operationally free end of said nut body, said locking member comprising an annular generally cylindrical base portion, the outer surface of which coincides substantially with the wrench portion of the nut body, said base portion being integral with said nut body and extending a substantial distance coaxially therefrom, said base portion being of uniform thickness extending axially of said nut body and bent downwardly to project over the end surface of said nut body as close as possible thereto so as to provide a radially inwardly extending locking membrane formed with a central opening therein having a continuous peripheral edge provided with an inner thread cut therein corresponding to the inner thread cut in said nut body, the thread carrying portion of the latter projecting into said pot-shaped locking member with the free end face of such thread carrying portion disposed adjacent to the inner face of said locking membrane, and the peripheral portion of said thread carrying portion disposed in radially spaced relation with respect to the inner surface of said base portion, said locking membrane having a thickness not less than one-half the width of a turn of the thread cut in said nut body and not greater than the width of a turn of the thread cut in said nut body and the thread cut in said locking membrane being axially displaced with respect to the thread cut in said nut body.

2. A locknut according to claim 1, wherein the thickness of said locking membrane corresponds substantially to the full width of a turn of the thread cut in said nut body.

3. A locknut according to claim 1, wherein said nut body terminates at the operationally free end in a surface disposed in a plane extending substantially perpendicular to the axis thereof, said locking membrane extending substantially in parallel with said surface and consequently being movable substantially only in an axial direction away from said surface of said nut body.

4. A locknut according to claim 1, for threaded cooperation with screw-threaded bolt or the like, wherein said locking membrane exerts in threaded engagement with said bolt on the flanks of the thread engaged thereby elastic pressure in a direction axially of the body of said nut for the purpose of locking said nut in threaded engagement with said bolt.

References Cited in the file of this patent

UNITED STATES PATENTS

| | | |
|---|---|---|
| 2,258,181 | Hinds | Oct. 7, 1941 |
| 2,385,390 | Tripp | Sept. 25, 1945 |
| 2,834,390 | Stevens | May 13, 1958 |